United States Patent [19]

Durbin

[11] Patent Number: 4,679,139

[45] Date of Patent: Jul. 7, 1987

[54] METHOD AND SYSTEM FOR DETERMINATION OF DATA RECORD ORDER BASED ON KEYFIELD VALUES

[75] Inventor: James W. Durbin, Fortuna, Calif.

[73] Assignee: Canevari Timber Co., Inc., Fortuna, Calif.

[21] Appl. No.: 605,788

[22] Filed: May 1, 1984

[51] Int. Cl.⁴ .................... G06F 7/22; G06F 12/00
[52] U.S. Cl. ............................ 364/200; 364/300; 340/146.2
[58] Field of Search ... 364/200 MS File, 900 MS File, 364/300; 340/146.2

[56] References Cited

U.S. PATENT DOCUMENTS

| | | | |
|---|---|---|---|
| 3,900,834 | 8/1975 | Casey et al. | 364/200 |
| 3,972,026 | 7/1976 | Waitman et al. | 364/900 |
| 4,074,254 | 2/1978 | Belser et al. | 364/900 |
| 4,101,968 | 7/1978 | Florene | 364/900 |
| 4,209,845 | 6/1980 | Berger et al. | 364/900 |
| 4,443,860 | 4/1984 | Vidalin | 364/900 |
| 4,524,427 | 6/1985 | Vidalin et al. | 340/146.2 |
| 4,559,612 | 12/1985 | Vrielink | 364/900 |
| 4,570,221 | 2/1986 | Martens | 364/200 |
| 4,575,798 | 3/1986 | Lindstrom et al. | 364/200 |

Primary Examiner—Archie E. Williams
Assistant Examiner—Thomas C. Lee
Attorney, Agent, or Firm—Spensley Horn Jubas & Lubitz

[57] ABSTRACT

A system and method for manipulating a plurality of data records. Each record is comprised of a plurality of bits and is identified by a unique record address value. A portion of each record comprises a keyfield consisting of one or more sub-keyfields, each having a different order of significance. The sub-keyfield value of greatest significance of each record is utilized to enter the unique record addresses into a column of a compressed matrix memory means in a logical row corresponding to the sub-keyfield value of that record. The column entries of the set compressed matrix memory locations are then arranged in order of row position, and the column entries derived from the same row are grouped together. The process is successively repeated, separately for each group of duplicate column entries, for the sub-keyfield value of next greatest significance of each record in the group as long as at least one group of duplicate column entries remain and all sub-keyfields have not been processed.

27 Claims, 5 Drawing Figures

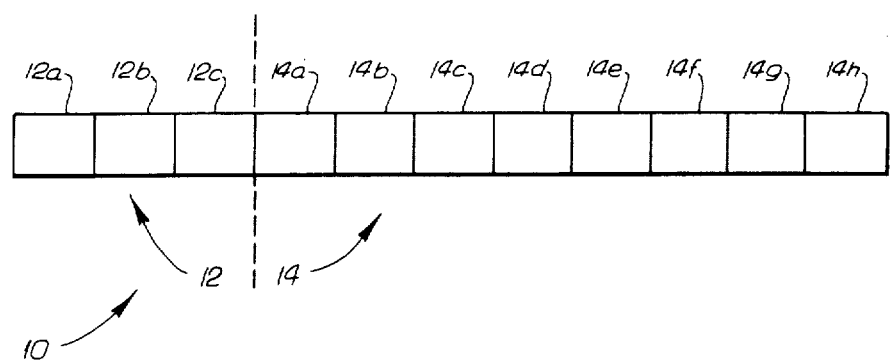

Fig. 4
COMPRESSED MATRIX MEMORY CONTENTS

FLAG = ∅ FOR INACTIVE
FLAG = 1 FOR ACTIVE

| | A TAIL RAM | A TAIL FLAG | A HEAD RAM | A HEAD FLAG | B TAIL RAM | B TAIL FLAG | B HEAD RAM | B HEAD FLAG | C TAIL RAM | C TAIL FLAG | C HEAD RAM | C HEAD FLAG | D TAIL RAM | D TAIL FLAG | D HEAD RAM | D HEAD FLAG |
|---|---|---|---|---|---|---|---|---|---|---|---|---|---|---|---|---|
| 0 | | ∅ | ∅ | 1 | | ∅ | | N/A | | ∅ | | N/A | | ∅ | | N/A |
| 1 | | ∅ | 1 | 1 | | | | | | | 1 | 1 | | | | |
| 2 | 6 | 1 | 2 | 1 | | | | | | | | N/A | | | | |
| 3 | | ∅ | 1 | ∅ | | | | N/A | | | 3 | 1 | | | | N/A |
| 4 | | | 4 | 1 | | | 6 | ∅ | | | | N/A | | | 4 | 1 |
| 5 | | | 5 | 1 | | | | N/A | | | | | | | | N/A |
| 6 | | | 4 | ∅ | | | 6 | 1 | | | | | | | 6 | 1 |
| 7 | | | 7 | 1 | | | | N/A | | | | | | | | N/A |
| 8 | | | | N/A | | | | | | | | | | | | |
| 17 | | ∅ | | | | | | | | | | | | | | |
| 18 | 3 | 1 | | | | | | | | | | | | | | |
| 19 | 7 | 1 | | | | | | | | | | | | | | |
| 20 | | ∅ | | | | | | | | | | | | | | |
| 46 | | | | | | ∅ | | | | | | | | | | |
| 47 | | | | | 4 | 1 | | | | | | | | | | |
| 48 | | | | | | ∅ | | | | | | | | | | |
| 115 | | | | | | | | | | ∅ | | | | | | |
| 116 | | | | | | | | | 3 | 1 | | | | | | |
| 117 | | | | | | | | | | ∅ | | | | | | |
| 118 | | ∅ | | | | | | | 1 | 1 | | | | | | |
| 119 | 2 | 1 | | | | | | | | ∅ | | | | | | |
| 120 | | ∅ | | | | | | | | | | | | | | |
| 128 | | ∅ | | | | | | | | | | | | | | |
| 129 | ∅ | 1 | | | | | | | | | | | | | | |
| 130 | | ∅ | | | | | | | | | | | | | | |
| 183 | | | | | | | | | | | | | | ∅ | | |
| 184 | | | | | | | | | | | | | 6 | 1 | | |
| 185 | | | | | | | | | | | | | | ∅ | | |
| 186 | | | | | | | | | | | | | | ∅ | | |
| 187 | | | | | | | | | | | | | | ∅ | | |
| 188 | | | | | | | | | | | | | 4 | 1 | | |
| 189 | | | | | | | | | | | | | | ∅ | | |
| 190 | | ∅ | | | | | | | | | | | | | | |
| 191 | 5 | 1 | | | | | | | | | | | | | | |
| 192 | | ∅ | | | | | | | | | | | | | | |
| 255 | | ∅ | | N/A | | ∅ | | N/A | | ∅ | | N/A | | ∅ | | N/A |

Fig. 5
RESULT STORAGE CONTENTS

FLAG = ∅ FOR INACTIVE
FLAG = 1 FOR ACTIVE

| | A RESULT RAM | A RESULT FLAG | A DUPLICATE FIFO | A DUPLICATE FLAG | B RESULT RAM | B RESULT FLAG | B DUPLICATE FIFO | B DUPLICATE FLAG | C RESULT RAM | C RESULT FLAG | C DUPLICATE FIFO | C DUPLICATE FLAG | D RESULT RAM | D RESULT FLAG | D DUPLICATE FIFO | D DUPLICATE FLAG |
|---|---|---|---|---|---|---|---|---|---|---|---|---|---|---|---|---|
| 0 | 6 | ∅ | ∅ | 1 | 4 | ∅ | 2 | 1 | 4 | ∅ | ∅ | ∅ | 6 | 1 | N/A | N/A |
| 1 | 4 | 1 | 2 | 1 | 6 | 1 | ∅ | ∅ | 6 | 1 | N/A | N/A | 4 | 1 | | |
| 2 | 3 | ∅ | N/A | N/A | 3 | ∅ | N/A | N/A | 3 | 1 | | | 3 | 1 | | |
| 3 | 1 | 1 | | | 1 | 1 | | | 1 | 1 | | | 1 | 1 | | |
| 4 | 7 | 1 | | | 7 | 1 | | | 7 | 1 | | | 7 | 1 | | |
| 5 | 2 | 1 | | | 2 | 1 | | | 2 | 1 | | | 2 | 1 | | |
| 6 | ∅ | 1 | | | ∅ | 1 | | | ∅ | 1 | | | ∅ | 1 | | |
| 7 | 5 | 1 | | | 5 | 1 | | | 5 | 1 | | | 5 | 1 | | |
| 8 | N/A | N/A | | | N/A | N/A | | | N/A | N/A | | | N/A | N/A | | |
| 255 | N/A | N/A | N/A | N/A | N/A | N/A | N/A | N/A | N/A | N/A | N/A | N/A | N/A | N/A | N/A | N/A |

4,679,139

METHOD AND SYSTEM FOR DETERMINATION OF DATA RECORD ORDER BASED ON KEYFIELD VALUES

BACKGROUND OF THE INVENTION

1. Field of the Invention.

This invention relates to systems and methods for determining the order of sets of data records based upon the value of the keyfields associated with each record.

Information to be processed by a computer apparatus may be stored in computer memory or on some external storage device such as a magnetic tape or magnetic disk. The information is typically blocked or grouped into units, commonly referred to as "records," each of which contains similar information. For example, a business may compile a record of each of its employees, customers and/or products. Each record is comprised of different pieces of information, commonly referred to as "fields." For example, an employee record may include fields such as employee name, age, address, and social security number. Each field contains one or more alphanumeric characters. Each alphanumeric character is typically coded in binary form.

It is frequently desirable to determine of the records based upon the value of a selected field, commonly referred to as the "keyfield." For example, it may be desirable to determine the order of employee records alphabetically by employee name. This is typically accomplished by repeated comparisons of the coded binary keyfield values under control of a computer program to form an ordered sequence of records.

2. Description of the Prior Art.

Ordering of information is one of the most extensively used applications performed by today's general purpose computers. To accomplish this task, systems for ordering of data records based on the coded binary value of the keyfields associated with each record are well known. However, prior systems have several disadvantages associated with them.

For example, some systems operate at relatively slow speeds due to the fact that for each record, each and every bit comprising the keyfield of that record is processed in series. Other systems also function at relatively slow speeds because the keyfield of a record is repeatedly directly compared with the keyfields of many or all other records. Some systems overcome this speed limitation by employing multiple duplicative stages of comparison hardware and/or relatively large amounts of local storage. The system disclosed in U.S. patent application Ser. No. 410,414 filed on Aug. 23, 1982, now U.S. Pat. No. 4,611,310, to the same inventor as the present application overcomes the speed limitation but requires a relatively large matrix memory for holding the intermediate results of the ordering process.

Accordingly, it is an object of the present invention to provide a general system and method for ordering a plurality of records based on the coded binary value of the keyfields associated with each record, which overcomes the above disadvantages.

SUMMARY OF THE INVENTION

This invention is directed to a method for determining the order of a plurality of records, each having a keyfield, in accordance with the coded binary value of the keyfields. Each keyfield comprises a plurality of keyfield bits arranged in a predetermined keyfield bit order. Each keyfield is divided into one or more sub-keyfields which are logically adjacent portions of keyfields comprising an equal number of keyfield bits. Processing is performed on successive sub-keyfields in order of decreasing sub-keyfield significance until the order of the set of records is resolved.

Each record is accessible by a unique corresponding record address or number. The present invention includes a first random access memory called the Tail RAM. The addressable rows of the Tail RAM correspond to sub-keyfield values.

The present invention further includes a second random access memory called the Head RAM. The addressable rows of the Head RAM correspond to the record numbers.

The first step in the ordering method and system disclosed by the present invention is to load the Tail and Head RAMs. The most significant sub-keyfield of each record is accessed and processed in order of its corresponding record number. Using the sub-keyfield value to select a row of the Tail RAM, the current record number is loaded into the selected row. Using the current record number to select a row of the Head RAM, the current record number is usually loaded into the selected row. However, if the selected row of the Tail RAM contained a record number before being loaded with the current record number (i.e., a previously processed record had the same sub-keyfield value as the current record), the former record number in the Tail RAM is loaded into the selected row of the Head RAM.

At the completion of the loading process, the contents of the Tail and Head RAMs form a plurality of record number "chains". Each chain comprises record numbers corresponding to records having the same sub-keyfield value. Each record number in a chain points to the next record number in the chain. The chains are arranged in order of increasing sub-keyfield value. The record numbers within each chain are in order of decreasing record number, i.e., in the reverse order of record processing. A chain comprised of only one record number is called a "single-entry chain." A chain comprised of two or more record numbers is called a "duplicate chain."

Stated another way, the Tail and Head RAMs logically comprise a "compressed" matrix of record numbers. The matrix has a fixed number of addressable rows, each row corresponding to a unique sub-keyfield value. The matrix has a variable number of columns. The number of columns in a given row is equal to the number of records having the sub-keyfield value associated with that row. Each column in a given row contains a unique record number corresponding to a record having the sub-keyfield value associated with that row. The record numbers in each row comprise a chain.

For example, assume that only record "17" had a sub-keyfield value of "v". The contents of Tail RAM row "v" would be "17". This indicates that the last (and, in this case, only) processed record having a sub-keyfield value "v" is record "17". In other words, record "17" is the first (and, in this case, only) record number in the chain for a sub-keyfield value "v".

The contents of Head RAM row "17" would also be "17". This indicates that no processed record other than record "17" had a sub-keyfield value "v". In other words, record "17" is also the last record number in the chain for sub-keyfield value "v". That is, record 17 comprises a single-entry chain.

As another example, assume that records "6", "13" and "17" all had a sub-keyfield value "v". The contents of Tail RAM row "v" would be "17". This indicates that the last processed record having a sub-keyfield value "v" is record "17". That is, record "17" is the first record number in the chain for sub-keyfield value "v".

The contents of Head RAM row "17" would be "13". This indicates that record "13" is the next record number in the chain for sub-keyfield value "v".

The contents of Head RAM row "13" would be "6". This indicates that record "6" is the next record number in the chain for sub-keyfield value "v".

Finally, the contents of Head RAM row "6" would also be "6". This indicates that record "6" was the last record number in the chain for sub-keyfield value "v." Thus, records "17", "13", and "6" comprise a duplicate chain for sub-keyfield value "v".

The second step in the ordering method and system of the present invention, is to successively write into a storage means the record numbers in each chain in order of increasing sub-keyfield value. Since rows of the Tail RAM correspond to sub-keyfield values, and the contents of each relevant row is the first record number in a chain, and each record number in a chain points to the next record number in the chain, record number ordering may be accomplished by writing in consecutive order to the storage means the record numbers in each chain in ascending order of their corresponding Tail RAM row.

The rearranged record number order after this two-step process is the desired order, provided that no two records have the same most significant sub-keyfield values, i.e., there are no duplicate chains. If this is not the case, record numbers within a chain would not necessarily be properly ordered with respect to each other, although would be properly ordered relative to the record numbers in all other chains.

In order to arrange record numbers having identical most significant sub-keyfield values, the above-discussed two-step process is repeated successively for each duplicate chain using the next most significant sub-keyfield. The rearranged record numbers of a particular duplicate chain are then rewritten to the same place in the storage means in order to preserve the proper record number order with respect to all other chains.

The algorithm is repeated with respect to successive sub-keyfields in order of decreasing significance until each record is found to have a unique cumulative keyfield value (i.e., there are no more duplicate chains), or until all sub-keyfields have been processed. It is important to note that this algorithm requires reading the sub-keyfield values a maximum of one time for each selected set of input records. In addition, sub-keyfields for records for which the order is resolved are no longer accessed during the processing of the remainder of the unresolved records. Moreover, the matrix memory required (i.e., the Tail and Head RAMs) is relatively small because of the chain approach. That is, the matrix memory is "compressed."

BRIEF DESCRIPTION OF THE DRAWINGS

FIG. 1 depicts a sample data format of a record for illustrating the method and system of the presen invention.

FIG. 2 depicts sample data for eight records for illustrating the method and system of the present invention.

FIG. 4 depicts a series of tables showing the contents of the compressed matrix memory means at various stages of processing the sample data of FIG. 2.

FIG. 5 depicts the contents of the result storage means at various stages of processing of the sample data of FIG. 2.

DETAILED DESCRIPTION OF A PREFERRED EMBODIMENT

Figure 3:
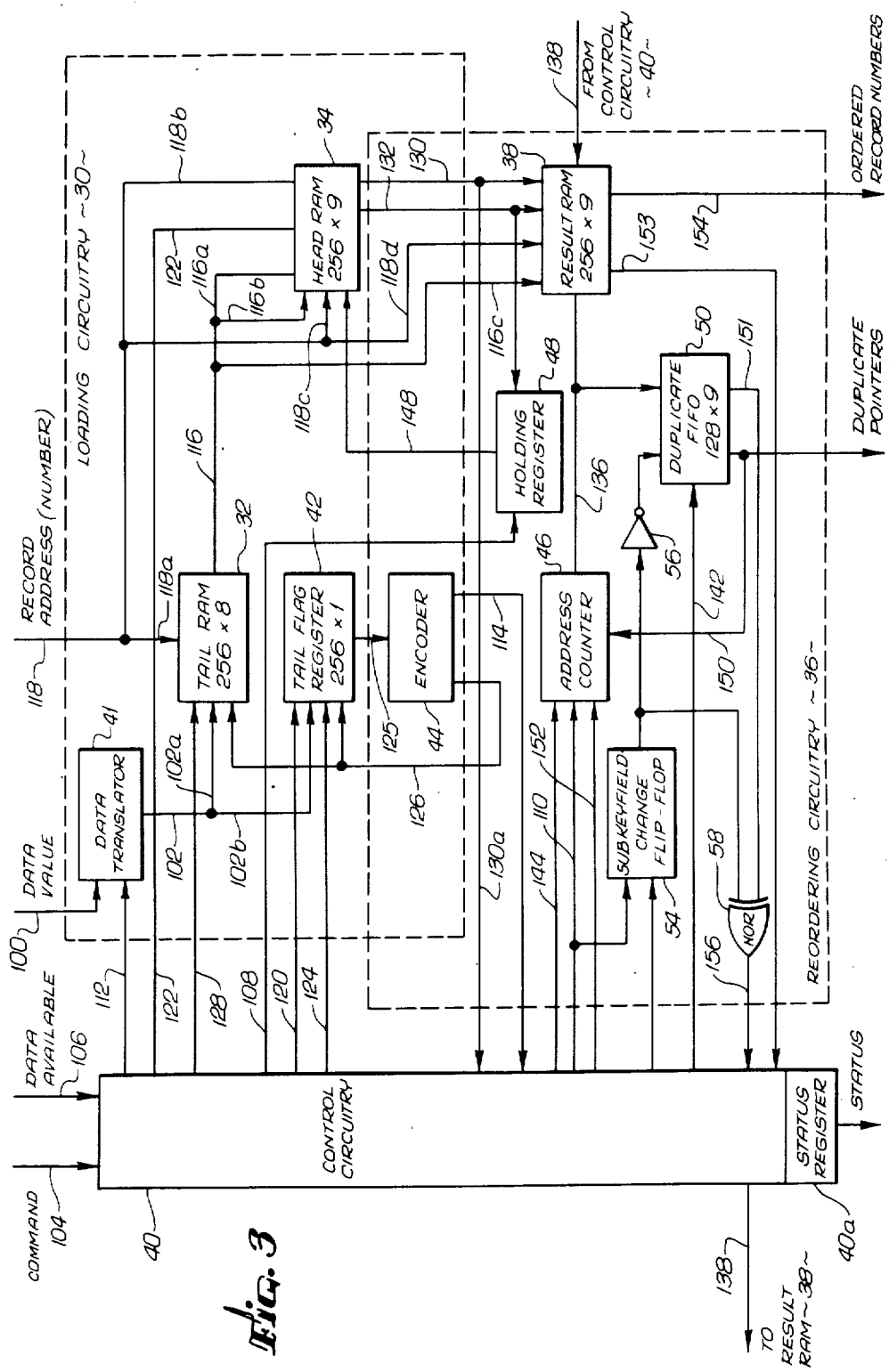
FIG. 3 is a block diagram of the circuitry in a preferred embodiment of the present invention.

The following description is of the best presently contemplated mode of carrying out the invention. This description is not to be taken in a limiting sense, but is made merely for the purpose of illustrating the general principles of the invention. For example, the sub-keyfields and record number storage elements are designated as having a length of 8 bits, although this could be either a larger or smaller number without affecting the basic principles involved. The scope of the invention is best defined by the appended claims.

In a preferred embodiment of the present invention, the circuitry comprising the invention is controlled either by a microprogrammed hardware controller interfaced to a general purpose computer, or. directly by a general purpose computer, hereinafter referred to as the "host processor". The records to be ordered are loaded into the memory of the host processor and each is assigned a unique record address or number. For purposes of illustration, it will be assumed that up to two hundred fifty-six records may be simultaneously arranged and that the record numbers range from 0 to 255. Ordering of larger numbers of records with the illustrated device may be accomplished by algorithms which would repeatedly order selected sets of up to two hundred fifty-six records.

Records having a data format as shown in FIG. 1 are to be rearranged in accordance with their keyfield values. Each record 10 includes a 24-bit keyfield 12 comprised of three 8-bit sub-keyfields 12a, 12b, and 12c designated in order of descending significance. The binary coded value of each sub-keyfield is therefore 0 to 255. The record 10 further includes eight additional 8-bit fields 14a. through 14h.

The ordering method and system of the present invention is capable of ordering records of virtually any data format (e.g., ASCII, EBCDIC, signed and unsigned integers, packed decimal, floating point, etc.) by first converting the "raw" sub-keyfield value of each record into a predetermined binary value using any conventional device for this purpose such as a device which utilizes well-known table-look-up techniques for translating data.

It will be apparent to a person skilled in the art to which this invention pertains that the method and system of the present invention is also capable of ordering records of almost any physical or logical format such as any number, order or location of sub-keyfields, any size of sub-keyfields, nested and overlapped sub-keyfields, and variable size sub-keyfields.

FIG. 3 is a block diagram of the logic for one preferred embodiment of the present invention. This logic includes Loading Circuitry 30 for controlling the Loading Process; i.e., loading record numbers into the Tail RAM 32 and Head RAM 34 so that the contents of these two RAMs constitute record number chains. This logic further includes Reordering Circuitry 36 for controlling the Reordering Process; i.e., writing each chain of record numbers to the Result RAM 38 in accordance with the sub-keyfield value associated with the chain. This logic still further includes Control Circuitry 40 for controlling the operation of the Loading and Reordering Circuitry based on internal conditions (e.g., the state of various flag bits) and on external signals from the host processor (not shown).

The five primary components of the Loading Circuitry 30 are the Data Translator 41, Tail RAM 32, Tail Flag Register 42, Head RAM 34 and Encoder 44.

The Data Translator 41 is a conventional device employing well-known table-look-up techniques for translating sub-keyfield data from one format into another format. Data Translator 41 converts the "raw" sub-keyfield value of each record received along line 100 into a predetermined binary value which is outputted along line 102.

The Tail RAM 32 is a random access memory comprising two hundred fifty-six 8-bit rows. Each row corresponds to a unique sub-keyfield value from 0 to 255. At the completion of the Loading Process, the contents of row r will be the record number of the last record, if any, to have a sub-keyfield value r.

The Tail Flag Register 42 is a register comprised of two hundred fifty-six flip-flops corresponding to sub-keyfield values 0 through 255. At the completion of the Loading Process, if bit r is "active" (i.e., set to a logical "1") this means that at least one record had a sub-keyfield value r and that row r of the Tail RAM 32 contains the record number of the last record processed having a sub-keyfield value r. In this way, the active bits in the Tail Flag Register 42 function as pointers to the rows in the Tail RAM 32 whioh contain the first (and possibly only) record number in a chain.

The Head RAM 34 is a random access memory comprising two hundred fifty-six 9-bit rows. Each row corresponds to a unique record number from 0 to 255. At the completion of the Loading Process, the contents of the first eight bits of each row will be a record number. These record numbers together with the record numbers in the Tail RAM form a plurality of record number chains, each chain comprising record numbers corresponding to records having the same sub-keyfield value. The last bit in each row is a flag bit. If the flag bit is active, this means that the record number in that row is the last record number in the chain and corresponds to the first processed record in the chain.

The Endcoder 44 includes a conventional sensing device for sensing the state (i.e., logical "1" or "0") of the bit of the Tail Flag Register 42 corresponding to the sub-keyfield value of the record currently being processed. This is necessary so that a determination can be made whether the record currently being processed is the first in a chain.

The seven primary components included in the Reordering Circuitry 36 are the Encoder 44, Result RAM 38, Address Counter 46, Holding Register 48, Sub-keyfield Change Flip-Flop 54, and Duplicate FIFO 50.

The Encoder 44 also includes conventional hardware prioritization logic for generating an encoded bit number corresponding to the lowest numbered active bit in the Tail Flag Register 42. This is required because the encoded bit number is a pointer to rows in the Tail RAM 32 containing the first record number in each chain.

The Result RAM 38 is a random access memory comprising two-hundred fifty-six 9-bit rows. During the Reordering Process, the fecord numbers in each chain logically comprising the Tail RAM 32 and Head RAM 34 are successively written into the first eight bits of consecutive rows in the Result RAM 38 in increasing order of the sub-keyfield value associated with each chain. The last bit in each row is a flag bit indicating whether or not the record number is the last one in the chain. If the record number loaded into a row is not the last record number in the chain, the flag bit in the row is made "inactive" (i.e., set to a logical "0"; otherwise the flag bit is made "active" (i.e., set to a logical "1").

The Address Counter 46 is a conventional 8-bit presetable up counter, the contents of which represent the address (i.e., row number) in the Result RAM 38 for writing or reading entries. It is reset to 0 before the commencement of the Reordering Process and incremented by one each time an entry is made in a row of the Result RAM 38.

The Holding Register 48 is a conventional 8-bit register which holds the last record number read from the the Head RAM 39 and written to the Result RAM 38. This is required because that record number is a pointer to the next record number in the chain.

The Sub-keyfield Change Flip-Flop 54 is a conventional flip-flop. It is inactive during the processing of odd-numbered sub-keyfields and active during the processing of even-numbered sub-keyfields.

The Duplicate FIFO 50 is a conventional first-in-first-out memory comprising one hundred twenty-eight 9-bit rows. During the Reordering Process, the row number in the Result RAM 38 at which the first record number in a duplicate chain is written, is loaded into the first eight bits of a row in the Duplicate FIFO 50. The flag bit is set to the opposite state of the Sub-keyfield Change Flip-Flop 54 to indicate that the duplicate chain is to be processed for the next sub-keyfield after processing of the current sub-keyfield is completed.

The Control Circuitry 40 controls the operation and flow of information through the Loading Circuitry 30 and Reordering Circuitry 36 in response to commands received from the host processor (not shown). The Control Circuitry 40 includes a Status Register 40a which is a conventional register which contains a value indicating the status of current processing (e.g. for, Loading Process versus Reordering Process). The state of the Status Register 40a is sampled by the host processor.

FIG. 2 shows in decimal notation the values of the three sub-keyfields 20a, 20b, and 20c (in descending order of significance) of eight different sample records having record numbers 0 to 7. The operation of the logic of FIG. 3 will now be illustrated with reference to these eight sample records to be arranged into ascending order by cumulative sub-keyfield value.

The first step is to initialize all memory devices which are not automatically reset during the Loading or Reordering Process. This is accomplished in the following manner.

The host processor (not shown) delivers a reset command to the Control Circuitry 40 on line 104 and a data available signal on line 106. In response, the Control Circuitry 40: (1) clears its Status Register 40a to indicate that the Loading Process is to begin; (2) delivers a signal to the Tail Flag Register 42 on line 108 to cause each bit in the Register to be reset to the inactive state to indicate that no record numbers have yet been loaded into the Tail RAM 32; (3) . delivers a signal to the Address Counter 46 on line 110 to cause it to be reset to 0 to indicate that the first entry to be written into the Result RAM 38 will be at address 0; and (4) delivers a signal to the Sub-keyfield Change Flip-Flop 54 on line 110 to cause it to be reset to the inactive state to indicate that processing of an even-numbered sub-keyfield will be occurring.

The host processor then delivers to the Control Circuitry 40 along lines 104, control information indicating the type of translation, if any, to be performed by the Data Translator 41 on the sub-keyfield values. The Control Circuitry 40 causes the Data Translator 41 to perform the appropriate translation by an appropriate control signal on line 112. In the instant case, there is no translation to be accomplished and the Data Translator 41 will merely pass the sub-keyfield values unaltered on line 102.

The host processor then delivers a command signal to the Control Circuitry 40 along line 104 indicating that the Loading Process is to begin.

Referring to FIG. 2, column 2A, the host processor then sequentially delivers to the Loading Circuitry 30 the most significant sub-keyfield value of each of the eight sample records together with the record number corresponding to the sample record. This sequential processing in performed in order of increasing record number.

As shown in FIG. 2, column 2A, the most significant sub-keyfield of record 0 has a value 129. At the completion of the processing of record 0: (1) row 129 of Tail RAM 32 will contain the value 0 indicating that record 0 is the last processed record having a value 129; (2) bit 129 in the Tail Flag Register 42 will be set to the active state indicating that at least one processed record had a value 129; and (3) row 0 of the . Head RAM 34 will contain the value 0 in its record number portion and will have its corresponding flag bit set to the active state, indicating that no record processed before record 0 had a value 129 (i.e., that record 0 is the last record number in the duplicate chain for record numbers having a value 129). This is all accomplished in the following manner.

The value 129 is provided by the host processor along lines 100 to the Data Translator 41 and passed unaltered on lines 102 to address row 129 of the Tail RAM 32 and bit 129 of the Tail Flag Register 42. The Encoder 44 senses the inactive state of addressed bit 129 in the Tail Flag Register 42 along line 114. (It is inactive since all the bits were initially reset to the inactive state.) This inactive state is provided by the Encoder 44 to the Control Circuity 40 along line 114. Simultaneously, the contents of addressed row 129 of the Tail RAM 32 are read onto line 116. This data is insignificant since no data was previously loaded into row 129.

In response to receipt of the signal along line 114 indicating the inactive state of addressed bit 129 of the Tail Flag Register 42, the Control Circuitry 40 causes: (1) the insignificant data read onto line 120 from row 129 of the Tail RAM 32 to be ignored; (2) the current record number (i.e., 0) provided from the host processor to the Tail RAM 32 along line 118a to be written into addressed row 129 of the Tail RAM 32 (i.e., row 129 is the row addressed on line 102a); (3) addressed bit 129 of the Active Flag Register 42 (i.e., bit 129 is addressed on line 102b) to be set to the active state in response to a signal from the Control Circuitry 40 along line 120; and (4) the current record number (i.e., 0) provided from the host processor to the Head RAM 34 along line 118b to be written into addressed row 0 of the Head RAM 34 (i.e., row 0 is addressed on line 118c) in response to an appropriate signal from the Control Circuitry 40 along line 122.

Records 1 through 7 are sequentially processed in similar fashion. The only significant difference in operation from the processing of record 0 occurs in connection with records 3 and 6 which have the same most significant sub-keyfield values as records 1 and 4, respectively. That is, records 3 and 6 are each second record numbers in a duplicate chain. These differences are discussed below.

As shown in FIG. 2, column 2A records 1 and 3 both have a most significant sub-keyfield value of 18. Record 1 is processed before record 3. At the completion of the processing of record 1, row 18 of the Tail RAM 32 will contain the value 1 indicating that record 1 was the last processed record having a value 18. But at the completion of the processing of record 3, row 18 will contain the value 3 indicating that record 3 is the last processed record having a value 18. That is, record 3 is the start of the chain for sub-keyfield value 18.

At the completion of record 1 processing, bit 18 in the Tail Flag Register 42 will be active indicating that at least one processed record had a value 18. No change in bit 18 occurs during record 3 processing since the same condition obtains.

At the completion of record 1 processing, row 1 of the Head RAM 34 will contain the value 1 and an active flag bit, indicating that no record processed before record 1 had a value 18 (i.e., that record 1 is the last record in the chain for sub-keyfield value 18). No change in row 1 occurs during record 3 processing since the same condition obtains. However, at the completion of record 3 processing, in addition, row 3 of the Head RAM 34 will have an inactive flag bit indicating that at least one record processed before record 3 had a sub-keyfield value 18, and row 3 will contain the value 1 in its record number portion indicating that record 1 is such a record.

Record 1 is processed in a manner similar to that described above in connection with record 0. Record 3 is processed in the following fashion.

The sub-keyfield value 18 corresponding to record 3, is provided by the host processor along line 100 to the Data Translator 41 and passed unaltered on line 102 to address row 18 of the Tail RAM 32 and bit 18 of the Tail Flag Register 42. The Encoder 44 senses the active state of addressed bit 18 in the Tail Flag Register 42 along line 114. (Bit 18 was set to the active state during processing of record 1.) This active state is provided by the Encoder 44 along line 114 to Control Circuitry 40. Simultaneously, the contents of addressed row 18 of the Tail RAM 32 are read onto line 116. (That contents is the value 1 corresponding to record 1.)

In response to receipt of the signal along line 114 indicating the active state of addressed bit 18 of Tail Flag Register 42, the Control Circuitry 40 causes the following actions to occur.

The flag bit in Head RAM 34 row 3 (corresponding to record 3 and addressed along line 118c) is reset to the inactive state. At the same time, the record number portion in the same row 3 is loaded with the previous contents of Tail RAM 32 row 18 (i.e., the value 1 corresponding to record 1) currently on line 116a. The significance of this action is that the Head RAM 34 now contains record 1 in row 1 with an active flag bit, and contains record 1 in row 3 with an inactive flag bit, forming a duplicate chain of record numbers for records having a sub-keyfield value of 18.

The current record number (i.e., 3) provided from the host processor along line 118 is loaded into Tail RAM 32 row 18 (corresponding to sub-keyfield value 18 and addressed along line 102a), indicating the start of the duplicate chain. Bit 18 of the Tail Flag Register 42 is left in the active state, indicating that at least one record had a sub-keyfield value of 18.

If more records had a most significant sub-keyfield value of 18, they would be inserted into the Head and Tail RAMs in a similar fashion to create a longer duplicate chain.

The processing of records 4 and 6 is similar to the processing of records 1 and 3, respectively. As shown in FIG. 2, column 2A, records 4 and 6 both have a most significant sub-keyfield value of 2. That is, records 4 and 6 comprise a duplicate chain for sub-keyfield value 2.

At the completion of the Loading Process for the most significant sub-keyfields, the contents of the Tail RAM 32, Tail Flag Register 42, and Head RAM 34 (hereinafter referred to collectively as "the Intermediate Memory Devices") will be as shown in FIG. 4, column 4A. For example, bits 2, 18, 19, 119, 129 and 191 in the Tail Flag Register 42 are active, indicating that at least one record had a corresponding sub-keyfield value equal to the bit number and pointing to the corresponding row in the Tail RAM 32. Tail RAM 32 row 2 has a value 6 indicating that record 6 is the first record number in the chain and pointing to row 6 in the Head RAM 34. The flag bit in Head RAM 34 row 6 is active indicating that the number in the record number portion is another record number in the chain and a pointer to the corresponding row in the Head RAM 34. Head RAM 34 row 6 has a value 4 indicating that record 4 is the next record number in the chain and pointing to row 4 in the Head RAM 34. The flag bit in Head RAM 34 row 4 is active indicating that there are no more records in the chain, i.e., having a sub-keyfield value of 2.

After the Loading Process has been completed, a Reordering Process is performed in which the record numbers in each chain are written to the Result RAM 38 in accordance with the most significant sub-keyfield values associated with each chain. Briefly, this is accomplished in the following manner.

The address of each active bit in the Tail Flag Register 42 is successively determined in order of increasing address. These addresses correspond to the most significant sub-keyfield values of one or more processed records, and are successively used to address corresponding rows in the Tail RAM 32. The contents of the selected Tail RAM 32 row is the start of a record chain, i.e., the first record number in the chain.

That first record number is used to address the corresponding row in the Head RAM 34. The contents of the selected Head RAM 34 row includes a record number portion and a flag bit indicating whether or not the record number portion contains a second record number in the chain.

The first record number (from the selected Tail RAM 32 row) and the flag bit (from the selected Head RAM 34 row) are written into the Result RAM 38 at location 0 as its first entry. If the flag bit is active, this indicates the end of the list, i.e., that this is a single-entry chain. If the flag bit is inactive, this indicates that the record number portion of the selected Head RAM 34 row contains the second record number in the chain. The second record number is then used to address another Head RAM 34 row. The second record number (from the first selected Head RAM 34 row) and the second flag bit (from the second selected Head RAM 34 row) are then written into the Result RAM 38 at location 1 as its second entry.

Once again, if the flag bit is active, this indicates the end of the chain, i.e., that the first two record numbers are the only record numbers in the duplicate chain. If the flag is inactive, this indicates that the record number portion of the second . Head RAM 34 row contains the third record number in the chain. The process continues until the end of the chain is encountered as indicated by an active flag bit.

The entire process is repeated for each active bit in the Tail Flag Register 42 in order of increasing address. By writing each record number and corresponding flag bit into consecutive locations in the Result RAM 38, the record numbers will then be arranged in order of increasing most significant sub-keyfield value. In addition, active flag bits indicate the end of a chain.

At this point, the Reordering Process will be described in greater detail with reference to the circuitry of FIG. 3 and using the contents of the Intermediate Memory Devices shown in FIG. 4, column 4A by way of example.

The host processor delivers to the Control Circuitry 40 a command along line 104 to initiate the Reordering Process. In response to that command, the Control Circuitry 40 delivers to the Encoder 44, a command along line 124 to determine the number of the first active bit in the Tail Flag Register 42. This is bit 2 corresponding to sub-keyfield value 2 detected for records 4 and 6. The Encoder 44, using well-known hardware prioritization techniques, encodes address 2 onto line 126 which in turn addresses bit 2 in the Tail Flag Register 42 and row 2 in the Tail RAM 32.

Bit 2 in the Tail Flag Register 42 is reset to the inactive state in response to a command on line 120 in preparation for the determination of the next active bit in the Register.

Row 2 in the Tail RAM 32 contains record 6 which is the first record in the chain for records having a most significant sub-keyfield value of 2. Record 6 is read onto line 116 in response to a command along line 128 and used to address row 6 of the Head RAM 34 and also used as input to the Result RAM 38.

The contents of row 6 of the Head RAM 34 are an inactive flag bit indicating that there are other records in the chain and record 4 which is the next record in the chain. The inactive flag bit and record 4 are read onto lines 130 and 132, respectively, in response to a command signal along line 122.

In response to a control signal along line 138, record 6 on line 116 is written into the record number portion of location 0 in the Result RAM 38 and the inactive flag bit on line 130 is written into the flag bit portion of location 0. The inactive flag bit indicates that record 6 is not the last record number in the chain. If it were an active flag bit, this would indicate that record 6 was the last record number in the chain.

(Location 0 in the Result RAM 38 was being addressed on line 136 by the contents of the Address Counter 46 which had been initialized to 0. Subsequently, Address Counter 46 is incremented by one in response to a command signal along line 144 so that it now contains the next location in the Result RAM 38 for writing the next entry therein.)

The Control Circuitry 40 also senses the inactive flag bit along line 130a and makes two determinations. First, that record 6 is one record number in a duplicate chain.

Thus, record 4 on line 132 must be used to address the next record number in the duplicate chain. Accordingly, record 4 is loaded into the Holding Register 48 in response to a command signal along line 146 and used to address row 4 in the Head RAM 34 along line 148. Later, the contents of row 4 will be read onto lines 130 and 132 just as was previously done with the contents of row 6.

Second, since record 6 was not written into the Result RAM 38 immediately after another record number having an associated inactive flag bit, record 6 must be the start of the duplicate chain. Accordingly, the Control Circuitry 40 causes an entry to be made in the Duplicate FIFO 50 consisting of the value 0 indicating that location 0 in the Result RAM 38 is the start of the duplicate chain, and a flag bit having an opposite state from the Sub-keyfield Change Flip-Flop 54 indicating that the duplicate chain beginning at location 0 in the Result RAM 38 is to undergo a second pass through the Loading and Reordering processes using the next most significant sub-keyfield of the associated records. This is accomplished in the following manner.

Starting location 0 was provided as input to the Duplicate FIFO 50 along line 136a. The active state of Sub-keyfield Change Flip-Flop 54 is inverted via inverter 56 and also provided as input to the Duplicate FIFO 50 along line 140. Both inputs are then written as one entry into the Duplicate FIFO 50 in response to a command signal along line 142.

Note that only one entry is made in the Duplicate FIFO 50 for each duplicate chain. That entry points to the location in the Result RAM 38 where the duplicate chain begins. No entry is made in the Duplicate FIFO 50 for single-entry chains since no further processing will be required in connection with the associated record.

As discussed above, record 4 in the Holding Register 48 is used to address row 4 of the Head RAM 34 via line 148. The contents of row 4 of the Head RAM 34 are an active flag bit indicating that there are no other record numbers in the current duplicate chain, and record 4 which is the second record number in the duplicate chain. The active flag bit and record 4 are read onto lines 130 and 132, respectively, in response to a command signal along line 122. Record 4 on line 132 and the active flag bit on line 130 are then written into the Result RAM 38 at location 1 currently being addressed on line 136 and corresponding to the present contents of the Address Counter 46. The Address Counter 46 is once again subsequently incremented by one in response to a command signal along line 144 so that it now contains the next location in the Result RAM 38 for writing the next record number in the ordered list and its associated flag bit.

The active flag bit on line 130 and stored at location 1 in the Result RAM 38 indicates the end of the current duplicate chain. Thus, the contents of the Duplicate FIFO 50 indicates that the current duplicate chain starts at location 0 in the Result RAM 38 and the active flag bit associated with record 4 in the Result RAM 38 at location 1 indicates the end of that chain.

The Control Circuitry 40 also senses the active flag bit along line 130a and determines that processing of the current duplicate chain is complete. Accordingly, the Control Circuitry 40 delivers to the Encoder 44 another command along line 124 to determine the number of the next active bit in the Tail Flag Register 42. This is bit 18 since bit 2 was previously reset to the inactive state. Bit 18 corresponds to sub-keyfield value 18. Records 1 and 3 both had a most significant sub-keyfield value of 18. That is, records 1 and 3 comprise a duplicate chain for sub-keyfield value 18.

At this point, records 1 and 3 are processed 1 and 3 comssed in a manner similar to that described above for records 4 and 6. The Encoder 44, encodes address 18 onto line 126 which in turn addresses bit 18 in the Tail Flag Register 42 and row 18 in the Tail RAM 32. Bit 18 in the Tail Flag Register 42 is reset to the inactive state in preparation for determination of the next active bit in the Register.

Row 18 in the Tail RAM 32 contains record 3 which is the first record in the duplicate chain. Record 3 is read onto line 116 and used to address row 3 of the Head RAM 34 and is also used as input to the Result RAM 38.

The contents of row 3 of the Head RAM 34 are an inactive flag bit indicating the existence of a duplicate chain, and record 1 which is the next record number in the chain. The inactive bit and record 1 are read onto lines 130 and 132, respectively.

Record 3 on line 116 and the inactive flag bit on line 130 are written into the Result RAM 38 at location 2, and the Address Counter 46 is incremented by one to point to the next location in the Result RAM 38.

The Control Circuitry 40 senses the inactive bit on line 130 indicating the existence of a duplicate chain. Therefore, duplicate chain starting location 2 on line 136a and an appropriate flag bit on line 140 indicating that the duplicate chain must be processed using the next most significant sub-keyfield, are written as the second entry in the Duplicate FIFO 50. In addition, record 3 is loaded into Holding Register 48 and used to address Head RAM 34 via line 148.

24. PD-7150

The contents of row 1 of the Head RAM 34 are an active flag bit indicating the end of the duplicate chain, and record 1 which is the second record in the chain. The active flag bit and record 1 are read onto lines 130 and 132, and written into the Result RAM 38 at location 3 corresponding to the present contents of the Address Counter 46. The Address Counter 46 is incremented by one to point to the next location in the Result RAM 38.

The Control Circuitry 40 senses the active flag bit along line 130a and determines that processing of the current duplicate chain is complete. Accordingly, the Control Circuitry 40 delivers to the Encoder 44 another command on line 124 to determine the number of the next active bit in the Tail Flag Register 42. This is bit 19 since bit 18 was previously reset to the inactive state. Bit 19 corresponds to sub-keyfield value 19. Only record 7 had a most significant sub-keyfield value of 19. That is, record 7 comprises a single-entry chain.

At this point, record 7 is processed in a manner similar to that described above for records 1 and 3, and 4 and 6, except that no entry is made in the Duplicate FIFO 50 since this is a single-entry chain. The Encoder 44 encodes address 19 onto line 126 which in turn addresses bit 19 in the Tail Flag Register 42 and row 18 in the Tail RAM 32. Bit 19 in the Tail Flag Register 42 is reset to the inactive state in preparation for determination of the next active bit in the Register.

Row 19 in the Tail RAM 32 contains record 7 which is the only record in the single-entry chain. Record 7 is read onto line 116 and used to address row 7 of the Head RAM 34 and is also used as input to the Result RAM 38.

The contents of row 7 of the Head RAM 34 are an active flag bit indicating a single-entry chain, and record 7 which is the only entry in the chain. The active bit and record 7 are read onto lines 130 and 132, respectively.

Record 7 on line 116 and the active flag bit on line 130 are written into the Result RAM 38 at location 4 and the Address Counter 46 is incremented by one to point to next location in the Result RAM 38.

The Control Circuitry 40 senses the active flag bit along line 130a indicating the single-entry chain. Thus, the Control Circuitry 40 recognizes that no entry in the Duplicate FIFO 50 is required and that processing of the current chain is complete. Accordingly, the Control Circuitry 40 delivers to the Encoder 44 another command along line 124 to determine the number of the next active bit in the Tail Flag Register 42. At this point, the remaining active bits in the Tail Flag Register 42 are bits 119, 129 and 191 corresponding to single-entry chains comprising records 2, 0 and 5 are sequentially processed. Accordingly, records 2, 0, and 5 are written into the Result RAM 38 with an active flag bit in the same manner as described above in connection with record 7.

At this point, the Control Circuitry 40 senses on line 114 that no active Tail Flag Register 42 bits remain and that the Reordering Process is now complete. The Control Circuitry 40 sets its Status Register 40a to a condition which indicates to the host processor that the Reordering Process is complete.

At this time, if there were no duplicate chains (i.e., if each record had a unique most significant sub-keyfield value), the record numbers would be arranged in the desired order without it being necessary to perform any operation whatsoever upon less significant sub-keyfields. However, in the illustrated example there are two duplicate chains present. Records 4 and 6 comprise one duplicate chain for sub-keyfield value 2, and records 1 and 3 comprise another duplicate chain for sub-kefield value 18. Thus, record numbers in each duplicate chain may not be properly ordered relative to each other, but are properly ordered relative to all other record numbers.

In order to rearrange record numbers within each duplicate chain relative to each other, it is necessary to perform a "second pass" through the two-step process described above; i.e., the two-step process is repeated for the records within each duplicate chain, but now using the second most significant sub-keyfield. During the second pass, the record numbers in a duplicate chain are rewritten in a rearranged order beginning at the lowest address in the Result RAM 38 where the first record number in the duplicate chain was previously stored, thereby preserving their order relative to all record numbers not within the duplicate chain.

The operation of the second pass through the Loading and Reordering Processes will now be described in greater detail with reference to the circuitry of FIG. 3 and using the contents of the Result RAM 38 and Duplicate FIFO 50 shown in FIG. 5, column 5A.

Sensing that the first pass has been completed and that there are duplicate chains left for processing, the host processor delivers to the Control Circuitry 40 along line 104 a command to begin the next pass of the Loading Process using the duplicate chains in the Result RAM 38. The host processor now reads the first entry in the Duplicate FIFO 50. This first entry includes (1) the value of 0 corresponding to the location or address in the Result RAM 38 where the first duplicate chain begins, and (2) an active flag bit which is opposite in polarity to the current inactive Sub-keyfield Change Flip-Flop 54.

The Control Circuitry 40 senses that the active flag bit for the first entry coming out of the Duplicate FIFO 50 has the opposite polarity of the inactive Sub-keyfield Change Flip-Flop 54 by sensing the output state of the exclusive-or gate 58 on line 156. This causes the Control Circuitry 40 to set its Status Register 40a to indicate that processing is being started for the next most significant sub-keyfield. At the same time, the Sub-keyfield Change Flip-Flop 54 is toggled to the active state to indicate current processing of an odd-numbered sub-keyfield. The Flip-Flop 54 will remain in the active state for the duration of processing of this sub-keyfield.

The Address Counter 46 is then loaded with the duplicate chain starting address of 0 on line 150 in response to a control signal from the Control Circuitry 40 along line 152. Thus, the Address Counter 46 now addresses on line 136 the location in the Result RAM 38. where the duplicate chain begins.

The host processor now requests reading of the contents of location 0 in the Result Ram 38 with a command to the Control Circuitry 40 on line 104. Control Circuitry 40 uses this address 0 to retrieve the first duplicate record number (i.e., 6) and its corresponding flag bit (i.e., inactive) from Result RAM 38. The host processor in turn uses this record number 6 to retrieve the second most significant sub-keyfield from record 6 in host memory. This sub-keyfield has a value of 47 as shown in FIG. 2, column 2B. Sub-keyfield value 47 along with corresponding record number 6 are then delivered to the Loading Circuitry 30 on lines 100 and 118, thus loading the Intermediate Memory Devices in the manner previously described in connection with the processing of the most significant sub-keyfield values.

The inactive state of the flag bit just read from the Result RAM 38 on line 154 is sensed by the Control Circuitry 40 which in turn indicates in its Status Register 40a that there are more record numbers to be processed in the current duplicate chain. This is sensed by the host processor which samples the Status Register 40a. The host processor then requests reading of the contents of the next location (i.e., 1) of the Result RAM 38 as just described for location 0. The contents of location 1 are the second record number in the duplicate chain (i.e., 4) and its corresponding flag bit (i.e., active). The host processor uses the record number 6 to retrieve the current sub-keyfield from record 4 in host memory. This sub-keyfield also has a value of 47 as shown in FIG. 2, column 2B. Sub-keyfield value 47 along with corresponding record number 4 are then delivered to the Loading Circuitry 30 on lines 100 and 118, thus loading the Intermediate Memory Devices.

At the same time, the active flag bit from location 1 of Result RAM 270 is sensed by the Control Circuitry 40, thus indicating the end of the current duplicate chain. The Control Circuitry 40 passes this information to the host processor through Status Register 40a. In response, the host processor senses that the current duplicate chain processing is now complete, and sends a command to the Control Circuitry 40 to again initiate the Reordering Process. The current contents of the Intermediate Memory Devices are shown in FIG. 4, column 4B.

At this point the only active bit in the Tail Flag Register 42 is bit 47 corresponding to the sub-keyfield value of 47 for records 4 and 6. This causes another duplicate chain consisting of records 6 and 4 to be written into locations 0 and 1 of the Result RAM 38. It also causes an appropriate entry to be made in the Duplicate FIFO consisting of (1) the value 0 corresponding to the new duplicate chain starting address, and (2) an inactive flag bit which is opposite in polarity to the active Sub-keyfield Change Flip-Flop 54 to indicate that this duplicate chain will be processed for the third sub-keyfield. The contents of the Result RAM 38 and Duplicate FIFO 50 after this Reordering Process are shown in FIG. 5, column 5B.

Sensing that there are still duplicates left by reading the Status Register 40a, the host processor (1) commands the Control Circuitry 40 to begin the Loading Process for the next duplicate chain, (2) obtains the next duplicate chain starting address which is location 2 in the Result RAM 38, (3) proceeds to read the duplicate chain record numbers (i.e., 3 and 1) from the Result RAM 38, and (4) delivers the current sub-keyfield for these records to the Loading Circuitry 40.

At the end of this Loading Process, the contents of the Intermediate Memory Devices are as shown in FIG. 4, column 4C. Status Register 40a will again indicate that all records have been processed for the current duplicate chain, and the host processor will again command the Control Circuitry 40 to begin the Reordering Process. At the end of this Reordering Process the contents of the Result RAM 38 and Duplicate RAM 50 are as shown in FIG. 5, column 5C. Note that in this case there are no further duplicate chains generated and that the final order of records 1 and 3 is determined.

Again reading Status Register 40a, the host processor senses that there is at least one more duplicate chain left to be processed, and that the third sub-keyfield must be accessed. The host processor then commands the Control Circuitry 40 to begin the next pass of the Loading Process using the duplicate chains in the Result RAM 38. The only duplicate chain remaining is comprised of records 4 and 6. This duplicate chain starts at location 0 in the Result RAM 38 as shown in FIG. 5, column 5C.

An appropriate Loading Process is then performed in the manner previously described and using the third sub-keyfields for records 4 and 6 as shown in FIG. 2, column 2C. The results of this Loading Process are shown in FIG. 4, column 4D. This is followed by an approprite Reordering Process in the manne previously described. The results of this Reordering Process are shown in FIG. 5, column 5D.

At this point there will be no duplicate chains left in Result RAM 38 and no entries left in Duplicate FIFO 50. As shown in FIG. 5, column 5D, the desired order of record numbers (i.e., 6, 4, 3, 1, 7, 2, 0 and 5) has been achieved, and may be read by the host processor and used in any manner to support the calling application.

It should be noted that if all sub-keyfields have been processed and there are duplicate chains remaining, the host processor may maintain the input order which has been reversed for the record numbers in the duplicate chains, by passing the record numbers as least significant sub-keyfield values. Alternately the presence of duplicate chains at this point is very useful for search applications. Not only will the presence of a match be indicated, but the record number of the match, or even multiple matches, is easily retrieved. Various other applications of the principles disclosed in the present invention will be apparent to those skilled in the art.

The scope of the invention is best defined by the following claims.

What is claimed is:

1. A system for arranging record numbers corresponding to a plurality of data records wherein each record is comprised of a plurality of bits and is identified by a unique record number, wherein a portion of each record comprises a keyfield, wherein the record numbers of the plurality of records are arranged in accordance with the value of said keyfields, said system comprising:
   a. intermediate storage means including:
      (i) a head memory means having a plurality of individually accessible storage areas, wherein each individually accessible storage area has a location address corresoonding to a different record number; and
      (ii) a tail memory means having a plurality of individually accessible storage areas, wherein each individually accessible storage area has a location address corresponding to a different keyfield value; and
   b. first control means for:
      (i) providing to the intermediate storage means, for each record, the record number and keyfield value of the record; and
      (ii) for each unique keyfield value:
         (A) for the first record having such keyfield value provided to the intermediate storage means, for loading the record number of the record into the storage area of the tail memory means having a location address corresponding to the keyfield value and also into the storage area of the head memory means having a location address corresponding to the record number of the said first record; and
         (B) for all subsequent records having such keyfield value provided to the intermediate storage means, for loading the record number currently stored in the storage area of the tail memory means having a location address corresponding to the key-field value into the storage area of the head memory means having a location address corresponding to the record number of said subsequent record, and for loading the record number of the subsequent record into said storage area of the tail memory means.

2. The system of claim 1 further comprising a second control means for successivley accessing from the intermediate storage means, for each storage area of the tail memory means having a record number stored therein in accordance with the location addresses of said storage areas which correspond to the keyfield values, a group of one or more record numbers, wherein the first record number in the group is accessed from the storage area of the tail memory means having a location address corresponding to that keyfield value, and wherein each succeeding record number in the group is accessed from the storage area of the head memory means having a location address corresponding to the immediately preceding accessed record number.

3. The system of claim 2 further comprising a final memory means having a plurality of individually accessible storage areas, and wherein the second control means successively loads each accessed record number into consecutive storage areas of the final memory means.

4. The system of claims 1 or 2 wherein the head and-/or tail memory means is a random access memory.

5. The system of claim 3 wherein the final memory means is a random access memory.

6. The system of claim 2 wherein:
   a. the intermediate storage means further includes tail-flag memory menas having a plurality of individually accessible memory locations, each of said memory locations having a location address corresponding to a different keyfield value;
   b. the first control means further includes setting means for setting, for each unique keyfield value provided to the intermediate storage means, the meory location in the tail-flag memory means having a location address corresponding to that keyfield value; and
   c. the second control means further includes detection means for successively detecting each storage area of the tail memory means having a record number stored therein in accordance with the location addresses of said storage areas which correspond to the keyfield values, by detecting the position of each set memory location in the tail-flag memory means in accordance with its location address corresponding to its keyfield value.

7. The system of claim 6 wherein the tail-flag memory means is a register.

8. The system of claim 2 wherein:
   a. the intermediate storage means further includes head-flag memory means having a plurality of individually accessible memory locations, each of said memory locations having a location address corresponding to a different record number;
   b. The first control means further includes setting means for setting, for each unique keyfield value, the memory location in the head-flag memory means having a location address corresponding to the first record number provide to the intermediate storage means having that keyfield value; and
   c. the second control means further includes detection means for detecting the end of a group of record numbers by detecting a set memory location in the head-flag memory means corresponding to the last record number in the group to be accessed.

9. The system of claim 8 wherein the head-flag memory means is a random access memory.

10. A system for arranging record numbers corresponding to a plurality of data records wherein each record is comprised of a plurality of bits and is identified by a unique record number, wherein a portion of each record comprises a keyfield, wherein the record numbers of the plurality of records are arranged in accordance with the value of said keyfields, said system comprising:
   a. intermediate storage means having a plurality of individually accesible storage areas each of which has a unique location address for storing a plurality of groups of one or more record numbers, wherein each group comprises record numbers of records having the samd keyfield value, wherein the groups are arranged in accordance with keyfield values, wherein the first record number in each group is stored in a storage area having a location address corresponding to its keyfield value and wherein each succeeding record number in the group is stored in a storage area having a location address corresponding to the immediately preceding record number in the group, and wherein the means includes:
      (i) head memory means having a plurality of individually accessible storage areas, wherein each storage area has a location address which corresponds to a different record number; and
      (ii) tail memory means having a plurality of individually accessible storage areas, wherein each storage area has a location address which corresponds to a different keyfield value;
   b. first control means for loading, for each group of record numbers:
      (i) the first record number in the group into the storage area of the tail memory means having a location address corresponding to the keyfield value of the group; and
      (ii) each succeeding record number in the group into the storage area of the head memory means having a location address corresponding to the preceding record number in the group;
   c. final memory means having a plurality of individually accessible storage areas; and
   d. second control means for sequentially moving into consecutive storage areas of the final memory means, for each group of record numbers in accordance with the keyfield values of each group as identified by the location address of the storage area of the tail memory means containing the first record number in each group:
      (i) the first record number in the group, which is contained in the storage area of the tail memory means having a location address corresponding to the keyfield value of the group; and
      (ii) each succeeding record number in the group, each of which is contained in the storage area of the head memory means having a location address corresponding to the preceding record number in the group.

11. A system for arranging record numbers corresponding to a plurality of data records wherein each record is comprised of a plurality of bits and is identified by a unique record number, wherein a portion of each record comprises a keyfield, wherein the record numbers of the plurality of records are arranged in accordance with the value of said keyfields, said system comprising:
   a. first random access memory having a plurality of addressable rows, wherein the address of each row corresponds to a different record number and is used to store a single record number;
   b. second random access memory having a plurality of addressable rows, wherein the address of each row corresponds to a different keyfield value and is used to store a single record number; and
   c. first control means:
      (i) for providing, for each record, the record number to the first random: access memory as an address and the keyfield value to the second random access memory as an address; and
      (ii) for each unique keyfield value:
         (A) for the first record having such keyfield value, for loading the record number of the record into the row of the second random access memory having an address corresponding to the keyfield value and also into the row of the first first random access memory having an address corresponding to the record number of the first record; and (B) for all subsequent records having such keyfield value, for loading the record number currently stored in the row of the second random access memory having an address corresponding to the keyfield value into the row of the first random access memory having an address corresponding to the record number of said subseqeunt record, and for loading the record number of the record into said row of the second random access memory.

12. The system of claim 11 further comprising a second control means for successively accessing, for each row of the second random access memory having a record number stored therein in accordance with the keyfield values corresponding to said rows, a group of one or more record numbers, wherein the first record number in the group is accessed from the row of the second random access memory having an address corresponding to that keyfield value, and wherein each succeeding record number in the group is accessed from the row of the first random access memory having an address corresponding to the immediatley preceding accessed record number.

13. The system of claim 12 further comprising a third random access memory having a plurality of addressable rows for sequentially storing record numbers, and wherein the second control means successively loads each accessed record number into consecutive rows of the third random access memory.

14. A system for arranging record numbers corresponding to a plurality of data records wherein each record is comprised of a plurality of bits and is identified by a unique record number, wherein a portion of each record comprises a keyfield, wherein each keyfield is divided into a plurality of sub-keyfields, each of said sub-keyfields having a different order of significance, and wherein the record numbers of the plurality of records are arranged in accordance with the value of said keyfields, said system comprising:

a. intermediate storage means including:
  (i) a head memory means having a plurality of individually accessible storage areas, wherein each individually accessible storage area has a location address corresponding to a different record number; and
  (ii) a tail memory means having a plurality of individually accessible storage areas, wherein each individually accessible storage area has a location address corresponding to a different subkeyfield value;

b. first control means for receiving the record number and sub-keyfield value of each record in a group of records, and, for each unique subkeyfield value received:
  (i) for the first record number received that is assocaited with such sub-keyfield value, for loading the record number into the storage area of the tail memory means having a location address corresponding to the sub-keyfield value and also into the storage area of the head memory means having a location address corresponding to said first record number; and
  (ii) for all subsequent record numbers received that are associated with such sub-keyfield value, for loading the record number currently stored in the storage area of the tail memory means having a location address corresponding to the sub-keyfield value, into the storage area of the head memory means having a location address corresponding to said subsequent record number, and for loading said subsequent record number into the storage area of the tail memory means having a location address corresponding to the sub-keyfield value.

c. Second control means for successively accessing from the intermediate storage means, for each storage area of the tail memory means having a record number stored therein in accordance with the location addresses of said storage areas which correspond to the sub-keyfield values, a group of one or more record numbers, wherein the first record number in the group is accessed from the storage area of the tail memory menas having a location address corresponding to that sub-keyfield value, and wherein each succeeding record number in the group is accessed from the storage area of the head memory means having a location address corresponding to the immediately preceding record number;

d. final memory means having a plurality of individually accessible storage areas each having a different location address;

e. third control means including a receiving means for receiving an address from a fourth control means, a loading means for loading each record number accessed by the second control means in the order accessed into consecutive storage areas of the final memory means, and a recording means for recording, for each group of mroe than one record number accessed by the second control means, each record number in the group and the location address of the storage area of the final memory means where the first record number in the group is loaded; and f. fourth control means for initially providing, for each reocrd, the record number and sub-keyfield value of greatest significance of that record to the first control means and the location address of the first storage area of the final memory means to the third control means, and, for subsequently providing, separately for each group of more than one record number recorded by the third control means, each record number in the group and its corresponding sub-keyfield value of next greatest significance to the first control means and the location address of the storage area of the final memory means recorded for the group by the third control means.

15. The system of claim 14 wherein the head and/or tail and/or final memory means is a random access memory.

16. The system of claim 14 wherein:
a. the intermediate storage means further includes tail-flag memory means having a plurality of memory locations, each of said memory locations having a location address corresponding to a different sub-keyfield value;
b. the first control means further includes setting means for setting, for each unique sub-keyfield value provided to the intermediate storage means, the memory location in the tail-flag memory means having a location address corresponding to that sub-keyfield value; and
c. the second control means further includes detection means for successivley detecting each storage area of the tail memory means having a record number stored therein in accordance with the sub-keyfield values corresponding to said storage areas, by detecting the location address of each set memory location in the tail-flag memory means in accordance with its corresponding sub-keyfield value.

17. The system of claim 16 wherein the tail flag memory means is a register.

18. The system of claim 14 wherein:
   a. the intermediate storage means further includes head-flag memory means having a plurality of memory locations, each of said memory locations having a location address corresponding to a different record number;
   b. the first control means further includes setting means for setting, for each unique sub-keyfield value, the memory location in the head-flag memory means having a location address corresponding to the first record number provided to the intermediate storage means having that sub-keyfield value; and
   c. the second control means further includes detection means for detecting the end of a group of record numbers by detecting a set memory location in the head-flag memory means having a location address corresponding to the last record number in the group to be accessed.

19. The system of claim 18 wherein the head-flag memory means is a random access memory.

20. The system of claim 18 wherein the recording means includes:
   a. first-in-first-out memory means for storing, for each group of more than one record number accessed by the second control means, the location address of the storage area of the final memory means where the first record number in the group is loaded;
   b. recording-detection means for detecting the location address of the storage area of the final memory means where the last record number in the group is loaded and
   c. accessing means for accessing each record number in the group stored between the two location addresses designated by the first-in-first-out memory means and the recording-detection means.

21. The system of claim 20 wherein the recording-detection means includes:
   a. detection memory means having a plurality of storage areas, wherein each storage area has a location address corresponding to a different storage area of the final memory means, for storing, for each record number loaded into the final storage means, the contents of the memory location of the head-flag memory means having a location address corresponding to that record number; and
   b. sampling means for successively sampling the contents of each memory location of the detection memory means having a location address corresponding to the record numbers in a group unitl a set memory location is encountered indicating that the location address of that set memory location is aloso the location address of the storage area of the final memory means where the last record number in the group is stored.

22. A method for arranging record numbers corresponding to a plurality of data records wherein each record is comprised of a plurality of bits and is identified by a unique record number, wherein a portion of each record comprises a keyfield, wherein the record numbers of the plurality of records are arranged in accordance with the value of said keyfields, said method comprising the steps of:
   a. providing the record number and keyfield value of each record to an intermediate storage means including a head memory means having a plurality of individually accessible storage areas, each of said storage areas having a location address corresponding to a different record number, and also including a tail memory means having a plurality of individually accessible storage areas, each of said storage areas having a location address corresponding to a different keyfield value; and
   b. for each unique keyfield value:
      (i) for the first record having such keyfield value provided to the intermediate storage means, loading the record number of the record into the storage area of the tail memory means having a location address corresponding to the keyfield value and also into the storage area of the head memory means having a location address corresponding to the record number of the said first record; and
      (ii) for all subsequent records having such keyfield value provided to the intermediate storage means, loading the record number currently stored in the storage area of the tail memory means having a location address corresponding to the keyfield value into the storage area of the head memory means having a location address corresponding to the record number of said subsequent record, and loading the record number of the subsquent record into said storage area of the tail memory means.

23. The method of claim 22 further comprising the step of successively accessing from the intermediate storage means, for each storage area of the tail memory means having a record number stored therein in accordance with the keyfield values corresponding to the location addresses of said storage areas, a group of one or more record numbers, wherein the first record number in the group is accessed from the storage area of the tail memory means having a location address corresponding to that keyfield value, and wherein each succeeding record number in the group is accessed from the storage area of the head memory means having a location address corresponding to the immediately preceding accessed record number.

24. The method of claim 23 further comprising the step of sequentially loading each accessed record number into storage areas of a final memory means having consecutive location addresses.

25. The method of claim 23 further comprising the steps of:
   setting, for each unique key filed value provided to the intermediate storage means, the memory location in a tail-flag memory means having a location address corresponding to that keyfield value; and
   b. successively detecting each storage area of the tail memory means having a record number stored therein in accordance with the keyfield values corresponding to the location addresses of said storage areas, by detecting the location address of each set memory location in the tail-flag memory means in accordance with its corresponding keyfield value.

26. The method of claim 23 further comprising the steps of:

a. setting, for each unique keyfield value, the memory location in a head-flag memory means having a location address corresponding to the first record number provided to the intermediate storage means having the keyfield value; and
b. detecting the end of a group of record numbers by detecting a set memory location in the head-flag memory means having a location address corresponding to the last record number in the group to be accessed.

27. A method for arranging record numbers corresponding to a plurality of data records wherein each record is comprised of a plurality of bits and is identified by a unique record number, wherein a portion of each record comprises a keyfield, wherein each keyfield is divided into a plurality of sub-keyfields, each of said sub-keyfields having a different order of significance, and wherein the record numbers of the plurality of records are arranged in accordance with the value of said keyfields, said method comprising the steps of:
  a. providing the record number and sub-keyfield value of greatest significane of each record to an intermediate storage means including a head memory means having a plurality of individually accessible storage areas, wherein each storage area has a location address corresponding to a different record number, and also including a tail memory means having a plurality of individually accessible storage areas, wherein each storage area has a location address correspodding to a different sub-keyfield value;
  b. for each unique sub-keyfield value: (i) for the first record having such sub-keyfield value provided to the intermediate storage means, loading the record number of the record into the storage area of the tail memory means having a location address corresponding to the sub-keyfield value and also into the storage area of the head memory means having a location address corresponding to the record number of the said first record; and (ii) for all subsequent records having such sub-keyfield value provided to the intermediate storage means, loading the record number currently stored in the storage area of the tail memory means having a location address corresponding to the sub-keyfield value into the storage area of the head memory means having a location address corresponding to the record number of said subsequent record, and loading the record number of the subsequent record into said storage area of the tail memory means;
  c. successively accessing from the intermediate storage means, for each storage area of the tail memory means having a record number stored therein in accordance with the sub-keyfield values corresponding to location address of said storage areas, a group of one or more record numbers, wherein the first record number in the group is accessed from the storage area of the tail memory means having a location address corresponding to that sub-keyfield value, and wherein each succeeding record number in the group is accessed from the storage area of the head memory means having a location address corresponding to the immediately preceding record number;
  d. loading each record number accessed in the order accessed into storage areas of a final memory means having consecutive location addresses;
  e. recording, for each group of more than one record number accessed, each record number in the group and the location address of the storage area of the final memory means where the first record number in the recorded group is loaded;
  f. repeating steps a through e, inclusive, separately for each recorded group of more than one record number accessed, for the sub-keyfield value of next greataest signifigance; and
  g. repeating step f so long as there is at least one recorded group of more than one record number accessed.

* * * * *